June 20, 1950  J. M. STOCKARD  2,511,882
ROTARY PUMP AND MOTOR HYDRAULIC TRANSMISSION DRIVE
Filed May 27, 1942  2 Sheets-Sheet 1
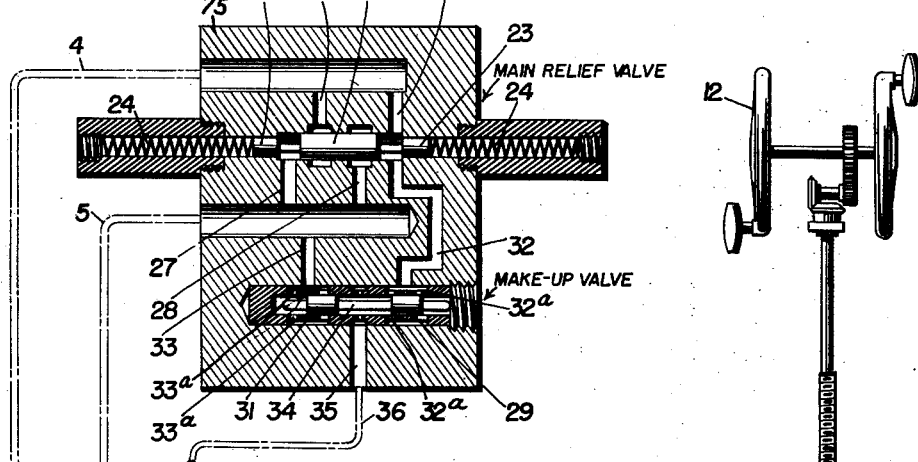
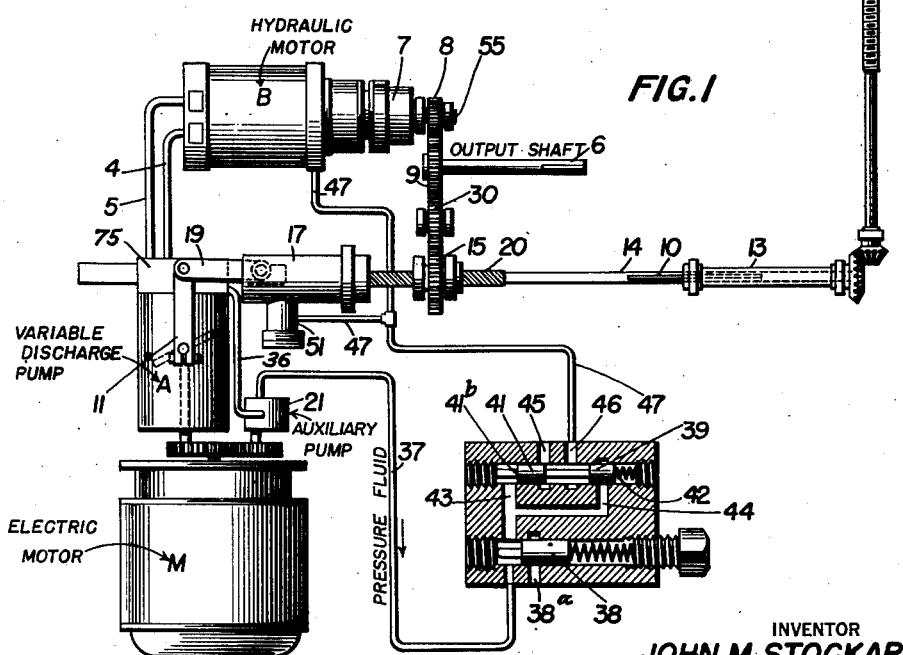
INVENTOR
JOHN M. STOCKARD
BY
ATTORNEY June 20, 1950 J. M. STOCKARD 2,511,882
ROTARY PUMP AND MOTOR HYDRAULIC TRANSMISSION DRIVE
Filed May 27, 1942 2 Sheets-Sheet 2
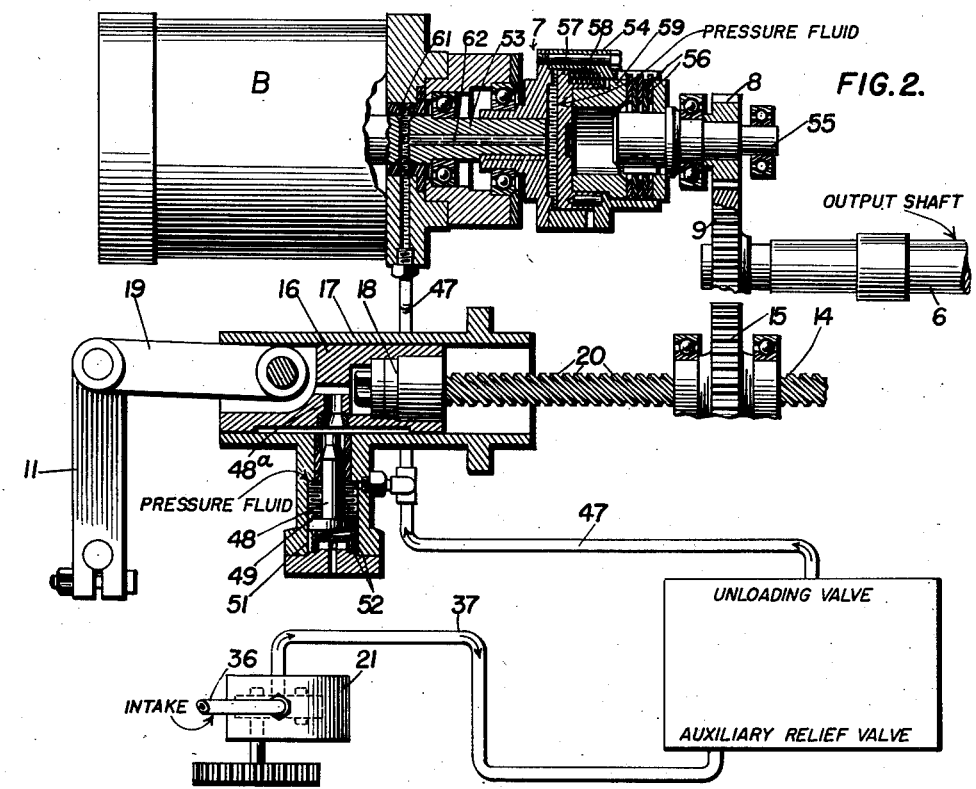
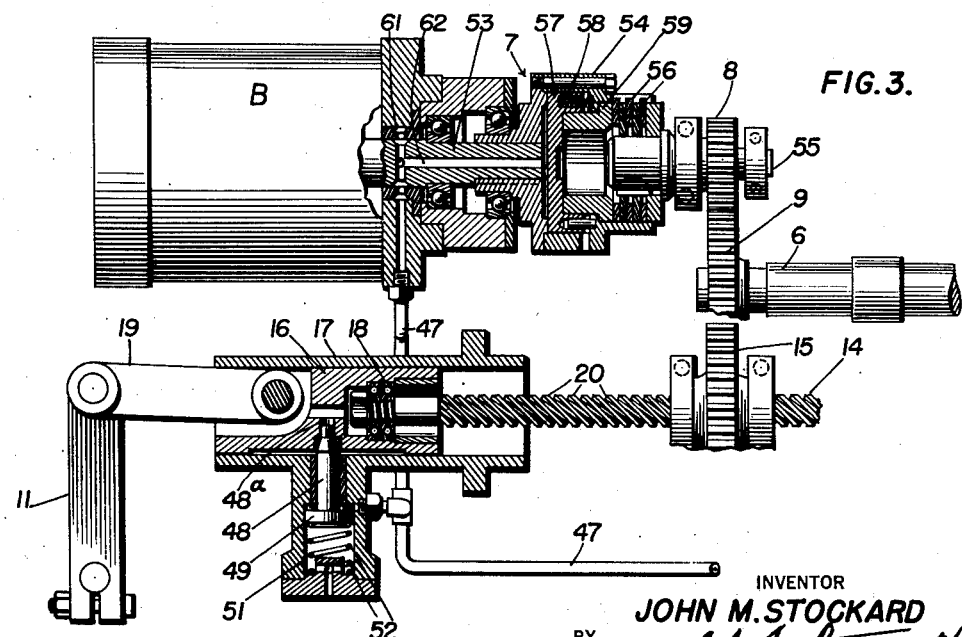
INVENTOR
JOHN M. STOCKARD Patented June 20, 1950

2,511,882

UNITED STATES PATENT OFFICE 2,511,882

ROTARY PUMP AND MOTOR HYDRAULIC TRANSMISSION DRIVE

John M. Stockard, Washington, D. C.

Application May 27, 1942, Serial No. 444,701

15 Claims. (Cl. 60—53)

(Granted under the act of March 3, 1883, as amended April 30, 1928; 370 O. G. 757)

This invention relates to a device for moving heavy objects, particularly for operating guns, turrets, torpedo launching gear, heavy tools, or other large machines.

One object of the device is to provide a machine of the type which will automatically provide for operation either by power or by hand.

Another object of the invention is to provide a hydraulic mechanism for the movement of heavy objects in which, in the event of a power failure, the control elements of the mechanism will be automatically locked in a position which will permit operation of the device by hand.

A further object of the device is to provide a mechanism whereby in the event of a power failure, and consequently operation of the device by hand, the power furnishing devices will be automatically disconnected so as to eliminate drag.

Still further objects, advantages, and improvements will be apparent from the following description of the invention taken in connection with the accompanying drawings, of which:

Fig. 1 is a diagrammatic view showing the schematic layout of the apparatus, with sectional views of the operating valve mechanism.

Fig. 2 is a detailed sectional view of the control locking mechanism and the clutch during the conditions of normal power operation.

Fig. 3 shows the same apparatus as in Fig. 2 but in position for hand operation after failure of power.

Fig. 4 is a cross-sectional view of the main relief and make-up valve casing which heads the variable discharge pump in Fig. 1.

Referring now to Fig. 1 of the drawings, there is shown a variable discharge pump A, driven by an electric motor M, or by any other suitable source of power. The output from the variable discharge pump is used to drive a positive displacement hydraulic motor B through suitable conduits 4 and 5 in a manner well known in the art. The pump and hydraulic motor of the type known as a "Waterbury gear" may be used for this purpose. The output shaft 6 is driven by the motor B through the clutch 7, and the gears 8 and 9.

While the motor M may operate at substantially constant speed, the discharge from the pump A may be varied to provide an infinite variation from zero discharge to maximum flow in either direction by means of a control lever 11 which operates a suitable cam arrangement, or in the case of the conventional "Waterbury gear, a tilting plate. The position of this control is regulated by the hand wheel 12, which turns the socket shaft 13 through suitable gears and shafting. The interior of socket shaft 13 is splined so as to impart rotation to, and allow for lateral movement of shaft 14 which is also splined at 10.

Shaft 14 is provided with threads 20, of relatively high pitch at the end opposite that which is splined. Gear 15 is provided with internal threads which cooperate with threads 20 on shaft 14 so that rotary movement of this gear results in lengthwise movement of the shaft 14. Gear 15 is journaled so as to mesh with idler gear 30, and rotates with this idler which is in turn operated by gear 9.

A yoke 16 (see Fig. 2) slides in a fixed tube 17, and is positioned within this tube by a suitable guideway to prevent rotational movement. Yoke 16 is connected to shaft 14 by a two way thrust bearing 18, and to the tilting plate control 11 by means of the connecting link 19.

An auxiliary pump 21 (Fig. 1), driven by motor M, takes oil from a suitable source such as a common supply tank containing all of the hydraulic elements, and delivers it primarily to the main hydraulic system, that is, pump A, motor B and lines 4 and 5 by way of supply line 36 to the make-up valve in a casing 75 (Fig. 4). The position of the make-up valve is controlled by means of appropriate ports and passages from the main hydraulic lines 4 and 5, so that oil from the auxiliary pump via supply line 36 is delievered either to line 4 or 5, whichever is at any instant the low pressure or return line from motor B to pump A. All of this is accomplished in a conventional manner, having no bearing upon this invention.

Also contained in casing 75 (Figs. 1 and 4) is the conventionl main relief valve (forming no part of this invention). This is a cylindrical sliding valve provided with a central section 22 and cylindrical end sections 23 and 23a of reduced cross sectional area, connected to the central section by short shanks. This valve is normally maintained in a central position by means of the springs 24. The lines 4 and 5 connect the hydraulic pump A and motor B as previously indicated, and in actual practice by-pass the oil through the valve components in casing 75 as determined by the pressure conditions in the system. Referring to the internal organization of the casing 75, the channel 25 leads to the main relief valve between the central section 22 and the reduced end section 23. Another channel 26 leads to the valve from line 4.

This channel is normally closed off by the central section of the valve 22. Channel 27 leads from line 5, the other conduit in the hydraulic system connecting pump A and motor B, to the end of the relief valve opposite to that of channel 25, between the central section 22 and the reduced end section 23a. Channel 28 leads from the line 5 to the valve also, but is normally closed off by the central section 22. Because the area of the central section 22 is larger than that of the end sections 23 and 23a, the tendency of the liquid in each of the channels 25 and 27 is to force the valve in the direction of the larger face, and therefore the valve would move in the direction away from the channel which is under the greater pressure but for the springs 24. However, if the pressure in line 4 and channel 25 becomes excessive for any cause, such as jamming of the motor B, it will overcome the force exerted by the oil in channel 27 and the spring pressing against the end section 23a so that the valve will move far enough to the left for oil in channel 25 to be by-passed through channel 28 to line 5, until the pressures in the two lines 4 and 5 are equalized. Similarly, if pressure rises excessively in supply pipe 5, for any cause, it will be by-passed through channels 27 and 26 to pipe 4 until the pressures in the two lines 4 and 5 are equalized.

Still referring to the internal organization of the casing 75, the make-up valve comprises two cylindrical sections or pistons, 29 and 31 of the same cross sectional area, connected by a shank 34 of reduced cross section. This shank extends beyond the ends of the valve sections 29 and 31 at each end to limit the lateral movement of the valve, the areas of the outermost faces of the pistons 29, 31 being equal. Channel 32 leads from line 4 through channel 25 to the piston 29 of the make-up valve, while channel 33 leads from line 5 to the piston 31 of the make-up valve. The differences in pressure in these channels and consequently on the outer faces of the pistons 29, 31 determine the position of the valve element. Each of the ports connecting the pistons 29 and 31 with the channels 32 and 33 respectively provides a split passageway so that oil may reach both faces of a valve piston when it is in a position exemplified by that of piston 29 in the drawing. In addition, a space is provided around the shank 34 so that oil may flow to either port 32a or 33a by way of the channel 35 from supply line 36. When the valve is in the position shown in the drawing, oil will flow from line 36 to channel 32, through port 32a past shank 34 thence to line 4, while piston 31 has cut off the flow of oil from line 36 to channel 33 through port 33a and thence to line 5.

The auxiliary pump 21, which operates whenever the motor M is in service, and therefore will cease to operate if there is a failure of power supplied to the motor, also furnishes oil under pressure to a supply line 37. An auxiliary relief valve 38 (which is no part of the invention) is provided in this line, and discharges through port 38a back into the supply tank in the event of an overload. An unloading valve is also provided in this line to permit oil to drain from the line to the supply tank in the event of power failure. This valve comprises two cylindrical sections 39 and 41, of equal cross sectional area, joined by a shank of narrower cross section. A spring 42 urges the valve in one direction, while the spindle extends beyond the end of the section 41 to provide a limit for the lateral movement of the valve. The oil entering from line 37 follows two paths through channels 43 and 44. Oil in channel 43 is always in contact with the face 41b of section 41. In the position shown in Fig. 1, the pressure against this face is not sufficient to overcome the nominal pressure of spring 42 and the flow of oil through channel 44 is therefore cut off by the valve section 39. However, when pump 21 is operating, the oil in channel 43 will push the entire valve to the right, uncovering the channel 44, while at the same time closing the discharge port 45. Oil then flows from channel 44 through the space surrounding the shank to the port 46 which leads to the supply line 47. When the pressure in line 37 and channel 43 drops because of the stopping of the auxiliary pump 21 or any other reason, spring 42 will move the valve to the left, cutting off channel 44 and reopening port 45, so that oil will drain from the line 47 and discharge from this port into the supply tank through the channel surrounding the valve shank.

The supply line 47 leads to the automatic control locking mechanism and to the automatic clutch 7. These devices are shown in detail in Figs. 2 and 3. The control locking mechanism comprises a detent 48 which engages an opening 48a drilled in the yoke 16. This detent is provided with a piston 49 which operates in a cylinder 51, mounted on the side of the tube 17, in response to pressure supplied by oil from pipe 47. A spring 52 tends to force the detent 48 into engagement with the opening in yoke 16 at all times, but so long as there is sufficient oil pressure acting against the piston 49 it will be held out of engagement as shown in Fig. 2.

Clutch 7, as shown in detail in Figs. 2 and 3, comprises a shaft 53 and clutch housing 54 attached to the hydraulic motor B, and driven shaft 55 to which is fixed the gear 8. These two shafts are mechanically connected together or disconnected by means of the clutch plates 56, alternate plates being attached by means of splines to shaft 55 and housing 54 in the usual manner. The interior of the housing 54 forms a cylinder within which a piston 57 fits. This piston is continuously urged in one direction (as shown in Fig. 3) by the springs 58. Movement in this direction removes any pressure against the collar 59, which in turn relieves the clutch plates 56 and prevents transfer of rotational movement of shaft 55 to shaft 53 or vice versa. A circular channel 61 surrounds shaft 53 and connects with the oil supply line 47. Shaft 53 is drilled longitudinally from one end to a point opposite the channel 61, at which point the shaft is provided with additional holes to allow oil to flow from the channel to the longitudinal hole 62. By means of these oil supply channels, it is possible to supply oil under pressure from pipe 47 to the face of the piston 57 opposite to that against which the springs 58 press. It will thus be seen that if sufficient pressure is supplied (which will be the case under all conditions of operation when power is furnished by motor M) the clutch will be in engagement so that the hydraulic motor will drive shaft 55 as shown in Fig. 2.

When it is desired to set the device in operation, the motor M is started, which will start the pump A, and the auxiliary pump 21. Under normal circumstances, oil supplied by the pump 21 will unlock the detent 48 which disengages the control for pump A, and will put the clutch 7 into engagement, both as previously explained.

Assuming that the control lever 11 was in a neutral position when the device was put in operation, no oil will flow in the circuit 4, 5 connecting pump A and hydraulic motor B. But if it is desired to shift the position of the operating shaft 6 in response to the wishes of the operator, it is only necessary to turn the handwheel 12 in the direction desired. Inasmuch as the output shaft 6 is usually attached to a mechanism possessing great inertia, this shaft will not rotate unless a substantial force is applied to it. At any rate, the inertia of the load in all cases will be sufficient so that rotation of the handwheel 12, and consequent rotation of the shaft 14, will not immediately result in rotation of the gear 15, but rather in a lateral displacement of the shaft 14 due to the pitch of the threads 20. This lateral displacement will operate the control lever 11 so that the pump A will begin to supply oil under pressure to the motor B, which in turn will operate gear 8, and the shaft 6, through gear 9. The resultant movement of shaft 6 and gear 9 will turn gear 15 through idler 30. The preceding operations are designed so that the rotation of gear 15 thus instituted will be such as to return the shaft 14, and the control lever 11 to its original position, at which time the control lever will be in neutral and the circulation of oil to the motor B will stop. In effect this portion of the device is a "follow-up" mechanism of simple construction.

In the event of a power failure and the consequent stopping of the motor M, there will no longer be a supply of oil to operate the hydraulic motor B and the shaft 6. If no means were provided for disconnecting the motor B from the shaft 6, it would be extremely difficult for hand operation of the device to effect movement of shaft 6, and in cold weather it might be impossible. But when motor M ceases operating, the pump 21 will also stop, thus disengaging the clutch 7 and disconnecting the motor B from the load on shaft 6. Stopping of the pump 21 will also release the detent 48 and permit it to be urged into engagement with the hole 48a in yoke 16 by the spring 52. If, when the power failed, lever 11 was in other than the neutral position the detent 48 will not then engage, but by rotation of shaft 14 in the proper direction the lever can be returned to neutral, and the detent will then engage the hole in the yoke 16. Once the detent has gone into engagement with the yoke 16, lateral movement of the shaft 14 will be prevented until power is again supplied to pump 21, and the detent thus forced back out of engagement. Once lateral displacement of shaft 14 has been stopped, a further rotation of the handwheel 12 and the shaft 14 can only result in movement of the shaft 6 through gear 15, idler 30 and gear 9, inasmuch as gear 15 is incapable of lateral movement itself. Operation of the shaft 6 is facilitated as previously explained by the disengagement of the motor B. When power is subsequently restored to motor M the whole system will return to power operation automatically.

While the invention has been described with reference to certain preferred examples thereof which give satisfactory results, it will be understood by those skilled in the art to which the invention pertains, after understanding the invention, that various changes and modifications may be made without departing from the spirit and scope of the invention, and it is my intention, therefore, to cover in the appended claims all such changes and modifications.

The invention herein described may be manufactured and used by or for the Government of the United States of America for governmental purposes without the payment of any royalties thereon or therefor. What is claimed as new and desired to be secured by Letters Patent of the United States is:

1. Movement imparting apparatus, comprising a prime mover, a main pump operated by said prime mover, an auxiliary pump operated by said prime mover, a fluid operated motor operated by said main pump, a driven shaft, and means including said auxiliary pump for automatically engaging said driven shaft with said fluid operated motor when said prime mover is operated.

2. Movement imparting apparatus, comprising a prime mover, a main pump operated by said prime mover, an auxiliary pump operated by said prime mover, a fluid operated motor operated by said main pump, a driven shaft, means including said auxiliary pump for automatically engaging said driven shaft with said fluid operated motor when said prime mover is operated, and means for automatically disengaging said shaft from said fluid operated motor when said prime mover is inoperative.

3. Apparatus for imparting movement to a shaft, comprising a prime mover, a main pump operated by said prime mover, an auxiliary pump operated by said prime mover, a fluid operated motor operated by said main pump, a clutch for operably engaging said shaft with said fluid operated motor, and means including said auxiliary pump for automatically engaging said clutch when said prime mover is operated.

4. Apparatus for imparting movement to a shaft, comprising a prime mover, a main fluid pump operated by said prime mover, a fluid operated motor operated by said main pump, means including a clutch for operatively engaging said shaft with said fluid operated motor, an auxiliary pump operated by said prime mover adapted to maintain said clutch in engagement when said prime mover actuates said auxiliary pump, manually actuated means capable of driving said shaft independently of said fluid operated motor, and means for automatically disengaging said clutch when said prime mover is inoperative, whereby said shaft is freed from the drag of said fluid operated motor when said shaft is driven by said manually actuated means.

5. Apparatus for imparting motion to a shaft, comprising a prime mover, a fluid pump operated by said prime mover, a fluid operated motor operated by said pump, means for operatively engaging said shaft with said fluid operated motor, means for regulating the fluid discharge from said pump, manual control means operatively connecting with said fluid discharge regulating means, means operatively connecting said shaft with said manual control means, and fluid operated means operative to insure manual actuation of said shaft by said manual control means when said prime mover is inoperative.

6. Apparatus for imparting motion to a shaft, comprising a prime mover, a fluid pump operated by said prime mover, a fluid operated motor operated by said pump, fluid operated means actuated by said prime mover for operatively engaging said shaft with said fluid operated motor, means for regulating the fluid discharge from said pump, manual control means operatively connecting with said fluid discharge regulating means, means operatively connecting said shaft with manual control means, and means for disengaging said shaft from said motor when said prime mover is inoperative, whereby said shaft is disengaged from said fluid motor for actuation by said manual control means when said prime mover is inoperative.

7. Movement imparting apparatus comprising a prime mover, a main pump operated by said prime mover, a fluid operated motor operated by said main pump, a driven shaft, said shaft being connected with said fluid operated motor by a clutch mechanism, an auxiliary pump operated concurrently with said main pump, said clutch mechanism being maintained in engagement by fluid supplied under pressure by said auxiliary pump.

8. Apparatus for imparting movement to a shaft, comprising a prime mover, a main pump operated by said prime mover, a fluid operated motor operated by said main pump, a clutch for operatively connecting said shaft with said motor, an auxiliary pump operated concurrently with said main pump by said prime mover for engaging said clutch when said prime mover is operative, means for regulating the fluid discharge from said main pump, manual control means operatively connected with said discharge regulating means, means operatively connecting said shaft with said manual control means, and means for disengaging said clutch when said prime mover is inoperative, whereby said shaft is disengaged from said fluid motor for actuation by said manual control means when said prime mover is inoperative.

9. Apparatus for moving heavy objects comprising a prime mover, a main pump operated by said prime mover, a fluid operated motor operated by said main pump, a driven shaft, said shaft being operatively connected to said fluid operated motor, an auxiliary pump operated concurrently with said main pump, means for regulating the discharge from said main pump, manual control means operatively connected with said discharge regulating means, a motion translating system operatively connecting said driven shaft and said manual control means, and locking means for permitting operation of said driven shaft by said manual control means independently of said discharge regulating means, said locking means being maintained in inoperative position by fluid controlled by said auxiliary pump.

10. Apparatus for moving heavy objects comprising a prime mover, a pump operated by said prime mover, a fluid operated motor operated by said pump, a driven shaft, said shaft being operatively connected to said fluid operated motor, means for regulating the discharge from said pump, manual control means operatively connected with said discharge regulating means, a motion translating system operatively connecting said driven shaft and said manual control means, locking means for permitting operation of said driven shaft by said manual control independently of said discharge regulating means, and means including an auxiliary pump operated concurrently with said main pump for supplying fluid under pressure to said locking means for maintaining the latter in unlocking position, said locking means becoming operative automatically upon the failure of said auxiliary pump to supply fluid to said locking means.

11. Apparatus for moving heavy objects comprising a prime mover, a main fluid pump operated by said prime mover, a fluid operated motor operated by said main pump, a driven shaft, said shaft being connected to said fluid operated motor by a clutch mechanism, an auxiliary fluid pump operated concurrently with said main pump, means for regulating the discharge from said main pump, manual control means operatively connected with said discharge regulating means, a motion translating system operatively connecting said driven shaft and said manual control means, and locking means for permitting operation of said driven shaft by said manual control independently of said discharge regulating means, said clutch mechanism being maintained in engagement and said locking means being maintained in inoperative position by fluid supplied by said auxiliary pump.

12. Apparatus for imparting movement to a shaft, comprising a prime mover, a pump operated by said prime mover, a fluid operated motor operated by said pump, and fluid operated means driven by said prime mover for automatically engaging said shaft with said fluid operated motor when said prime mover is operative.

13. Apparatus for imparting movement to a shaft, comprising a prime mover, a fluid pump operated by said prime mover, a fluid operated motor operated by said pump, a clutch for operatively connecting said shaft with said motor, fluid operated means actuated by said prime mover for maintaining said clutch in engaged condition when said prime mover is operative, manually actuated means for driving said shaft independently of said fluid operated motor, and means for automatically disengaging said clutch when said prime mover is inoperative, whereby said shaft is disengaged from said fluid motor for actuation by said manually actuated means when said prime mover is inoperative.

14. Movement imparting apparatus comprising an output shaft connectible with a heavy load, a mechanical power source for moving the output shaft, comprising a serially connected prime mover, main pump having a fluid discharge regulating means and hydraulic motor having a clutch responsive to fluid pressure to assume an engaging position, a detent for the regulating means responsive to fluid pressure to assume an unlocking position, an auxiliary pump driven by said prime mover, supplying pressure fluid to the clutch and detent for the respective purposes, a manual power source also for moving the output shaft, and a follow-up mechanism constituting a coupling between the manual power source, the fluid discharge regulating means, the clutch and the output shaft, for neutralizing said regulating means after each manual operation of the manual power source.

15. Movement imparting apparatus comprising an output shaft connectible with a heavy load, a mechanical power source for moving the output shaft, comprising a serially connected prime mover, main pump having a fluid discharge regulating means and hydraulic motor having a clutch responsive to fluid pressure to assume an engaging position, a detent for the regulating means responsive to fluid pressure to assume an unlocking position, an auxiliary pump driven by said prime mover, supplying pressure fluid to the clutch and detent for the respective purposes, a manual power source also for moving the output shaft, and a follow-up mechanism consisting of a telescopic screw shaft between the manual means and the fluid discharge regulating means, and a gear train connected with the output shaft and having terminal gears respectively carried by the clutch and screw shaft.

JOHN M. STOCKARD.

REFERENCES CITED

The following references are of record in the file of this patent:

UNITED STATES PATENTS

| Number | Name | Date |
|---|---|---|
| 567,327 | Volker | Sept. 8, 1896 |
| 2,097,857 | Ferris | Nov. 2, 1937 |
| 2,298,649 | Russell | Oct. 13, 1942 |

FOREIGN PATENTS

| Number | Country | Date |
|---|---|---|
| 1,072 | Great Britain | Jan. 14, 1911 |
| 3,917 | Great Britain | Feb. 14, 1914 |